United States Patent
Huttunen et al.

(10) Patent No.: US 11,557,055 B2
(45) Date of Patent: **\*Jan. 17, 2023**

(54) ARRANGEMENT FOR PRODUCING HEAD RELATED TRANSFER FUNCTION FILTERS

(71) Applicant: OWNSURROUND OY, Kuopio (FI)

(72) Inventors: Tomi A. Huttunen, Kuopio (FI); Antti J. Vanne, Los Gatos, CA (US)

(73) Assignee: APPLE INC., Cupertino, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/073,212

(22) Filed: Oct. 16, 2020

(65) Prior Publication Data

US 2021/0035319 A1 Feb. 4, 2021

Related U.S. Application Data

(63) Continuation of application No. 16/084,707, filed as application No. PCT/FI2017/050156 on Mar. 9, 2017, now Pat. No. 10,839,545.

(30) Foreign Application Priority Data

Mar. 15, 2016 (FI) ..................................... 20165211

(51) Int. Cl.
*G06T 7/60* (2017.01)
*G06K 9/62* (2022.01)
(Continued)

(52) U.S. Cl.
CPC .............. *G06T 7/60* (2013.01); *G06K 9/6247* (2013.01); *G06T 3/0068* (2013.01); *G06T 17/00* (2013.01);
(Continued)

(58) Field of Classification Search
CPC ......... G06T 7/60; G06T 3/0068; G06T 17/00; G06T 19/20; G06T 2207/10012;
(Continued)

(56) References Cited

U.S. PATENT DOCUMENTS 9,544,706 B1 1/2017 Hirst
10,038,966 B1 7/2018 Mehra
(Continued)

FOREIGN PATENT DOCUMENTS

CN 101483797 A 7/2009
CN 102984637 A 3/2013
(Continued)

OTHER PUBLICATIONS

First Office Action for Chinese Application No. 201910738957.9 dated Nov. 27, 2020, 14 pp.
(Continued)

*Primary Examiner* — Nimesh Patel
(74) *Attorney, Agent, or Firm* — Womble Bond Dickinson (US) LLP

(57) ABSTRACT

When three-dimensional audio is produced by using headphones, particular HRTF-filters are used to modify sound for the left and right channels of the headphone. As the morphology of every ear is different, it is beneficial to have HRTF-filters particularly designed for the user of headphones. Such filters may be produced by deriving ear geometry from a plurality of images taken with an ordinary camera, detecting necessary features from images and fitting said features to a model that has been produced from accurately scanned ears comprising representative values for different sizes and shapes. Taken images are sent to a server (52) that performs the necessary computations and submits the data further or produces the requested filter.

20 Claims, 5 Drawing Sheets

(51) Int. Cl.
| | |
|---|---|
| *G06V 20/64* | (2022.01) |
| *G06V 40/10* | (2022.01) |
| *G06T 3/00* | (2006.01) |
| *G06T 17/00* | (2006.01) |
| *G06T 19/20* | (2011.01) |
| *H04S 7/00* | (2006.01) |
| *H04S 1/00* | (2006.01) |

(52) U.S. Cl.
CPC .............. *G06T 19/20* (2013.01); *G06V 20/64* (2022.01); *G06V 40/10* (2022.01); *H04S 7/303* (2013.01); *G06T 2207/10012* (2013.01); *G06T 2207/10016* (2013.01); *G06T 2207/10028* (2013.01); *G06T 2219/2004* (2013.01); *G06T 2219/2016* (2013.01); *G06T 2219/2021* (2013.01); *H04S 1/005* (2013.01); *H04S 2420/01* (2013.01)

(58) Field of Classification Search
CPC . G06T 2207/10016; G06T 2207/10028; G06T 2219/2004; G06T 2219/2016; G06T 2219/2021; G06T 17/05; G06T 7/50; G06T 2207/30168; G06T 2207/30196; G06T 2207/30201; G06T 7/0002; G06T 9/00; G06T 9/001; G06T 5/006; G06T 2200/08; G06T 2207/10024; G06T 2219/2012; G06T 19/006; G06T 5/001; G06T 15/205; G06T 7/00; G06T 7/12; G06T 7/593; G06T 19/00; G06T 2207/20084; G06T 2207/20212; G06T 2207/20221; G06T 5/00; G06T 5/002; G06T 7/246; G06K 9/00201; G06K 9/00362; G06K 9/6247; G06K 9/00221; G06K 9/00389; G06K 9/00671; G06K 2009/00939; G06K 9/00006; G06K 9/64; G06K 9/00255; G06K 9/00268; G06K 9/036; G06K 9/4642; G06K 9/6202; G06K 9/00214; G06K 9/00355; G06K 9/00302; G06K 9/00315; G06K 2009/00644; G06K 9/00637; G06K 9/00664; G06K 9/4652; H04S 7/303; H04S 1/005; H04S 2420/01; A61K 38/18; A61K 2800/91; A61K 2800/92; A61K 31/194; A61K 2039/505; A61K 39/0007; A61K 47/6849; G06F 16/68; G06F 16/683; G06F 16/686; G06F 3/012; G06F 3/013; G06F 3/016; G06F 3/017; G06F 13/00; G06F 21/32; G06F 3/147; G06F 3/0346; G06F 9/30032; G06F 16/54; G06F 3/011; G06F 3/0304; A61B 8/0875; A61B 2562/028; A61B 5/0452; A61B 5/411; A61B 5/4869; A61B 5/7264; A61B 8/5207; A61B 8/5223; B64C 2201/122; B64C 2201/123; B64C 2201/127
See application file for complete search history.

(56) References Cited

U.S. PATENT DOCUMENTS

| | | | |
|---|---|---|---|
| 10,149,089 | B1 | 12/2018 | Edry et al. |
| 10,839,545 | B2* | 11/2020 | Huttunen ................ G06T 17/00 |
| 2006/0067548 | A1* | 3/2006 | Slaney .................... H04S 1/002 |
| | | | 381/303 |
| 2007/0270988 | A1 | 11/2007 | Goldstein et al. |
| 2013/0051565 | A1 | 2/2013 | Pontoppidan |
| 2013/0169779 | A1* | 7/2013 | Pedersen ............ G06K 9/00362 |
| | | | 348/77 |
| 2013/0286161 | A1* | 10/2013 | Lv .......................... G06K 9/036 |
| | | | 348/46 |
| 2014/0153727 | A1 | 6/2014 | Walsh et al. |
| 2014/0355765 | A1 | 12/2014 | Kulavik et al. |
| 2016/0227999 | A1 | 8/2016 | An et al. |
| 2016/0284123 | A1* | 9/2016 | Hare .................. G06K 9/00912 |
| 2018/0091921 | A1 | 3/2018 | Silva |
| 2018/0137663 | A1* | 5/2018 | Rodriguez ............. G06T 11/60 |
| 2019/0045317 | A1* | 2/2019 | Badhwar ................ H04S 1/005 |

FOREIGN PATENT DOCUMENTS

| | | |
|---|---|---|
| CN | 103455824 A | 12/2013 |
| CN | 104284286 A | 1/2015 |
| CN | 104503963 A | 4/2015 |
| CN | 104869524 A | 8/2015 |
| CN | 104956689 A | 9/2015 |
| CN | 107734428 A | 2/2018 |

OTHER PUBLICATIONS

Finnish Search Report dated May 2, 2019 for related Finnish Application No. 20165211; 6 Pages.
Final Office Action for U.S. Appl. No. 16/516,036 dated Sep. 24, 2020, 29 pages.
Final Office Action for U.S. Appl. No. 16/084,707 mailed.
Finnish Office Action dated Jun. 2, 2017 for Finnish Application No. 20165211, 6 pages.
Office Action for U.S. Appl. No. 16/357,193 dated Jul. 24, 2020, 33 pages.
Algazi, Duda; Duraiswami, Gumerov; and Tang, J. "Approximating the head-related transfer function using simple geometric models of the head and torso", Acoust. Soc. Am., vol. 112, No. 5, Pt. 1, Nov. 2002 (pp. 2053-2064).
Chinese Office Action dated Mar. 3, 2021 from related Chinese Application No. 201780016802.3 (12 pages).
Chinese Notice of Allowance dated Apr. 27, 2021 from related Chinese Application No. 201910738957.9 (4 pages).
European Office Action dated Aug. 30, 2021 from related EP Patent Application No. 19153780.2 (5 pages).
Finnish Office Action dated Jan. 13, 2021 from related Finnish Application No. 20185300 (6 pages).
U.S. Notice of Allowance dated Jan. 21, 2021 from related U.S. Appl. No. 16/516,036 (5 pages).
U.S. Notice of Allowance dated Oct. 29, 2020 from related U.S. Appl. No. 16/357,193 (9 pages).
Otani, Makoto and Ise, Shiro. "A fast calculation method of the head-related transfer functions for multiple source points based on the boundary element method" Acoust. Sci. & Tech. 24, 5, May 2003 (pp. 259-266).
Dong Lin. "Study on simplified auricular point cloud registration algorithm based on thousand CUDA", Master's Thesis, Liaoning Normal University, Jun. 2017, 46 pages (original Chinese language version).
Dong Lin. "Study on simplified auricular point cloud registration algorithm based on thousand CUDA", Master's Thesis, Liaoning Normal University, Jun. 2017, 36 pages (English translation).
Martin Rothbucher, et al. "Measuring Anthropometric Data for HRTF Personalization," 2010 Sixth International Conference on Signal-Image Technology and Internet Based Systems, Dec. 15-18, 2010, pp. 102-106, doi 10.1109/SITIS.2010.27.
Notice of Allowance from related Chinese Patent Application No. 201780016802.3 dated Jan. 11, 2022, 4 pages.
Non-Final Rejection of the USPTO dated Mar. 31, 2022 for related U.S. Appl. No. 17/315,176.
Notice of Allowance of the USPTO dated May 13, 2022 for related U.S. Appl. No. 17/187,514.
Final Office Action dated Aug. 10, 2022 for U.S. Appl. No. 17/315,176, 20 pages.

* cited by examiner

ARRANGEMENT FOR PRODUCING HEAD RELATED TRANSFER FUNCTION FILTERS

This patent application is a continuation under 35 U.S.C. § 120 of U.S. patent application Ser. No. 16/084,707, filed on Sep. 13, 2018, which is a national phase entry of International Application No. PCT/FI2017/050156, filed on Mar. 9, 2017, which claims priority to Finnish Patent Application No. 20165211, filed on Mar. 15, 2016, and the entire contents of those patent applications are hereby incorporated by reference.

DESCRIPTION OF BACKGROUND

Audio systems with multiple audio channels are commonly known and used by entertainment industry, for example in movies or computer games. These systems are often called Surround Sound systems or three-dimensional sound systems. The purpose of such systems is to provide more realistic sound that arrives from multiple directions. The most conventional approach to implement such audio systems is to provide a plurality of audio speakers into a room or a space, such as a movie theater. The main purpose of such systems is to allow sounds to arrive from different directions. Thus, the person watching a movie will get more realistic feeling when the sound related to a certain action will arrive from the supposed direction of the action. In earlier systems typically five different full bandwidth and one low-frequency audio channels were used, however, nowadays it is typical to use more sometimes even in home installations. Hence, in addition to the direction it is possible to use different channels for different sound frequency ranges. Typically low frequency sounds are produced by different type of speakers that are often called subwoofers.

In addition to the number of audio sources there are also other reasons having an effect on the sound and how realistic it is. The locations of audio sources are essential and the geometry of the room, furniture and similar have an effect on the sound. For example, in a big movie theater people in the front row may experience the sound differently than people in the backrow. In a home installation other furniture, windows, curtains and similar have an effect on the sound. Furthermore, the orientation and physical character of the person watching the movie will have an effect how he or she experiences the sound. Finally, the geometry of the outer ear (pinna) has a significant effect on the sound that arrives from sound source to person's eardrum.

Headphones are often preferred instead of speaker systems because they are portable and do not disturb other people. Conventionally the headphones were not able to produce three-dimensional sound but were limited to two channels, left and right respectively and the perceived sound is localized inside listener's head. More recently headphones with three-dimensional sound are introduce. The three-dimensional experience is produced by manipulating sounds in headphone's two audio channels so that they resemble directional sounds arriving in the ear-canal. The three-dimensional sound experience is possible by taking into account the effect of pinna, head and torso to the sound that enters to the ear-canal. These filters are often called HRTF-filters (Head-Related Transfer Function). These filters are used to provide an effect that is similar to how a human torso, head ear filters three dimensional sounds.

When the geometry of ears of a person is known a personal HRTF-filter can be produced so that the sound experienced through headphones is as realistic as possible. In conventional simulation based approach this geometry is produced by using a three-dimensional scanning device that produces three-dimensional model of at least portion of visible parts of the ear. This requires, however, a costly three-dimensional scanning device that can produce an accurate three-dimensional geometric model of an ear. It is possible to produce two filters so that both ears have their own filters respectively as the ears may be of different geometry. When the three-dimensional geometry is known a person skilled in the art can use various mathematical methods for producing an HRTF-filter from the acquired geometry. Even if in the above only geometry of an ear is discussed, a person skilled in the art understands that geometry of head and/or torso of the scanned person may be included in the filter production.

FIGS. 1, 2a and 2b are referred for better understanding of the framework. FIG. 1 is an illustration of an ear. The figure is referred only for purpose of disclosing the anatomy of an ear. FIGS. 2a and 2b are two models of an ear made by using a three-dimensional scanning device or by a camera system involving a plurality of cameras so that ear is imaged from multiple directions at the same time so that three-dimensional coordinates can be computed.

In order to improve the quality of three-dimensional audio systems it would be beneficial to produce individual HRTF-filters for each person using headphones. Thus, there is a need for an arrangement for providing the geometry needed for computing the filter.

SUMMARY

When three-dimensional audio is produced by using headphones particular HRTF-filters are used the sound for left and right channels of the headphone. As the morphology of every ear is different it is beneficial to have HRTF-filters particularly designed for the user of headphones. Such filters may be produced deriving ear geometry from a plurality of images taken with an ordinary camera, detecting necessary features from images and fitting said features to a model that has been produced from accurately scanned ears comprising representative values for different sizes and shapes. Taken images are sent to a server that performs the necessary computations and submits the data further or produces the requested filter.

In an embodiment a method for producing geometrical data for head related transfer function filters is disclosed. The method comprises receiving a at least one image frames comprising an image of a pinna, detecting points of significance in said pinna from said images frames, producing a point cloud from said points detected from the at least one image frame, registering said point cloud with a model database, wherein said model database comprises data derived from models of pinna including geometrical data related to said pinna and producing geometrical data for head related transfer function filter by processing said model database with said point cloud so that geometrical data corresponding with said point cloud is created by modifying geometrical data in said model database.

In an embodiment the model database is a pre-computed using so-called principle component analysis basis. In a further embodiment producing the geometrical data comprises morphing said model database. In another embodiment the plurality of image frames is a video sequence. In a further embodiment the registering comprises at least one of the following: translation, rotation and scaling.

In an embodiment the method disclosed above is used for producing a head related transfer function filter. In a further embodiment the method disclosed above is implemented as a computer software executed on a computing device.

In a further embodiment a three-dimensional camera is used instead of traditional camera. When a three-dimensional camera is used it may be sufficient to have only one three-dimensional image for deriving the point cloud mentioned above, however, it is possible to combine two or more three-dimensional images for producing the point cloud. Then, the point cloud is processed similarly as in case of two-dimensional images.

In an embodiment an apparatus is disclosed. The apparatus comprises at least one processor configured to execute computer programs, at least one memory configured to store computer programs and related data, and at least one data communication interface configured to communicate with external data communication networks. The apparatus is configured to execute a method as described above.

The benefits of described embodiments include possibility to produce individual HRTF-filters for users of headphones. Furthermore, a benefit of the present embodiments include possibility to produce own filters for each ear. This will improve how the user hears the produced audio and will have more realistic experience, for example, when watching a movie with three-dimensional sound.

A further benefit of the described embodiments include the possibility to provide individual filters using only a conventional camera, for example a mobile phone. The mobile device is used for acquiring image frames which are then transmitted to a service that can produce the necessary computations. This facilitates production of filters with technically simple tools, such as a mobile phone, instead of conventional requirement of a three-dimensional scanning arrangements. Thus, it is technically possible to use low cost devices for producing such filters.

A further benefit of the described 5 embodiments is the possibility to produce filters at home. This facilitates headphones with individual filters that can be ordered from an internet store. The person interested may order a desired headphone set from an internet store or buy from general market and produce the filter at home by imaging own head. This will facilitate easier sales of technically unique headphones.

A further benefit of the described embodiments is the possibility to produce filters that can be changed easily if a headphone set is used by a plurality of persons. This will facilitate better audio experience for all of the users.

BRIEF DESCRIPTION OF THE DRAWINGS

The accompanying drawings, which are included to provide a further understanding of an arrangement for producing head related transfer function filters and constitute a part of this specification, illustrate embodiments and together with the description help to explain the principles of the arrangement for producing head related transfer function filters. In the drawings.

DETAILED DESCRIPTION

Reference will now be made in detail to the embodiments, examples of which are illustrated in the accompanying drawings. In the following description expression "pinna" is used to denote the visible part of an ear, which can be image by using a conventional camera that may be arranged to a mobile device.

Figure 3:
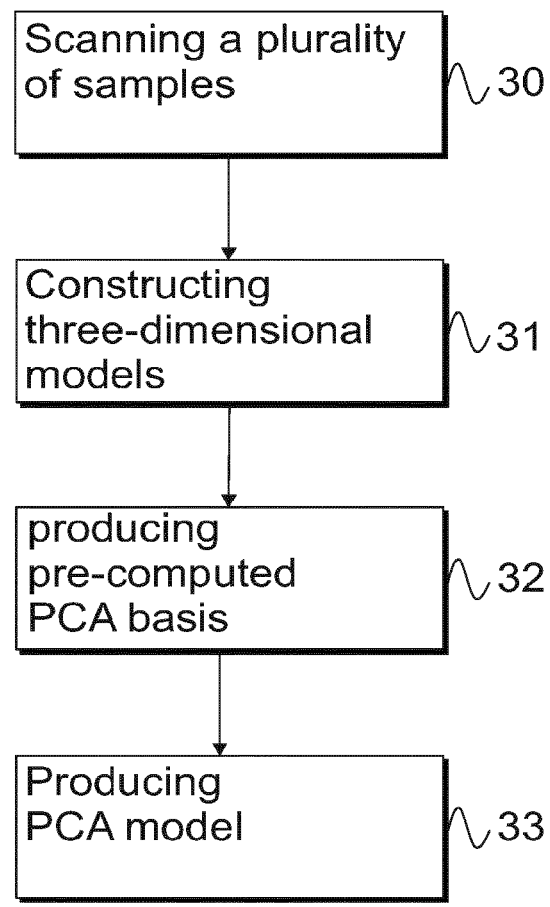
FIG. 3 is a flow chart of an embodiment.

In FIG. 3 a flow chart of a method for building a pre-computed PCA basis that is used in a method for producing geometry needed for producing a HRTF-filter. The PCA basis is an example of model database or morphable model. As shown in the flow chart firstly a plurality of samples are scanned, step 30. This scanning is done by using prior art means for scanning as explained in the background of the invention. The number of samples may be, for example, one hundred but it may be increased later and there is no upper limit. Also smaller numbers may be used, however, very small number will reduce the quality of the derived geometrical data. Thus, when additional persons are scanned accurately later geometries of their pinnae can be included in the sample set.

Figure 2A:
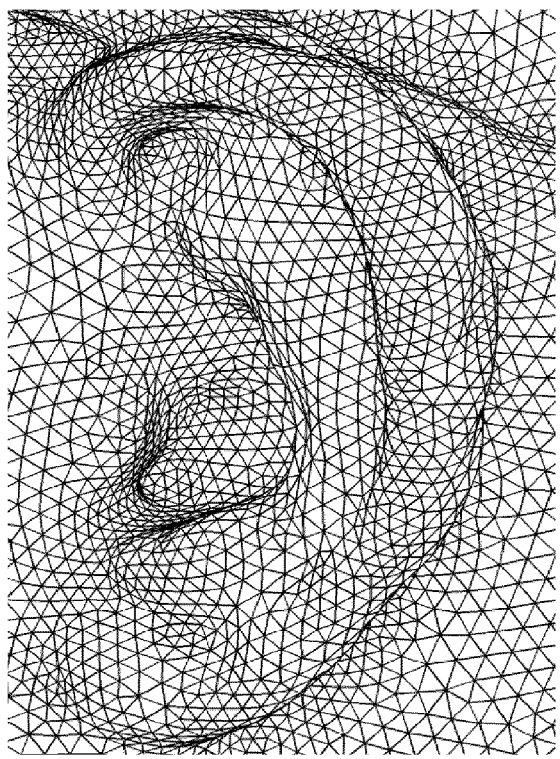
FIGS. 2a and 2b are examples of a three-dimensional model of a pinnae.
Figure 2B:
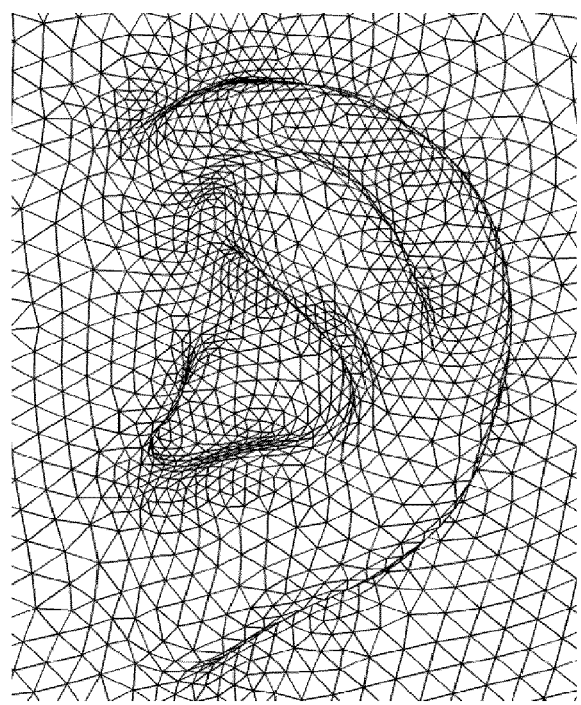

From the scanning result accurate three-dimensional pinnae models are constructed, step 31. In the embodiment surface models are constructed of three-dimensional vertices that form triangles. Examples of such surface models are shown in FIGS. 2a and 2b. Models for different pinnae may have different number of vertices and triangles at this stage. According to the conventional approaches these models or the information used to construct these models would directly be used for producing the filters.

The produced models are used as a training dataset for producing the pre-computed PCA basis that is used in an arrangement for producing head related transfer function filters, step 32. In the production principal component analysis (PCA) is used. PCA is a statistical method wherein in significant components are reduced from a set of data comprising also insignificant data so that the significant components can be presented without losing important information.

For the pre-computed PCA basis the acquired pinna models are processed in order to find physical correspondences between pinna models so that after processing they consist of equal number of vertices and the vertices have physical point-to-point correspondence. Thus, the same vertex number corresponds to same physical location in all processed models. The physical correspondence can be found by using an optic flow algorithm or similar.

Lastly a PCA model is constructed by using a PCA decomposition and using the most significant components of the PCA as geometric basis vectors. Thus, acquired geometries have been reprocessed into a model that provides representative values for different pinnae and which can be used in an arrangement for producing head related transfer function filters as will be described below.

Figure 4:
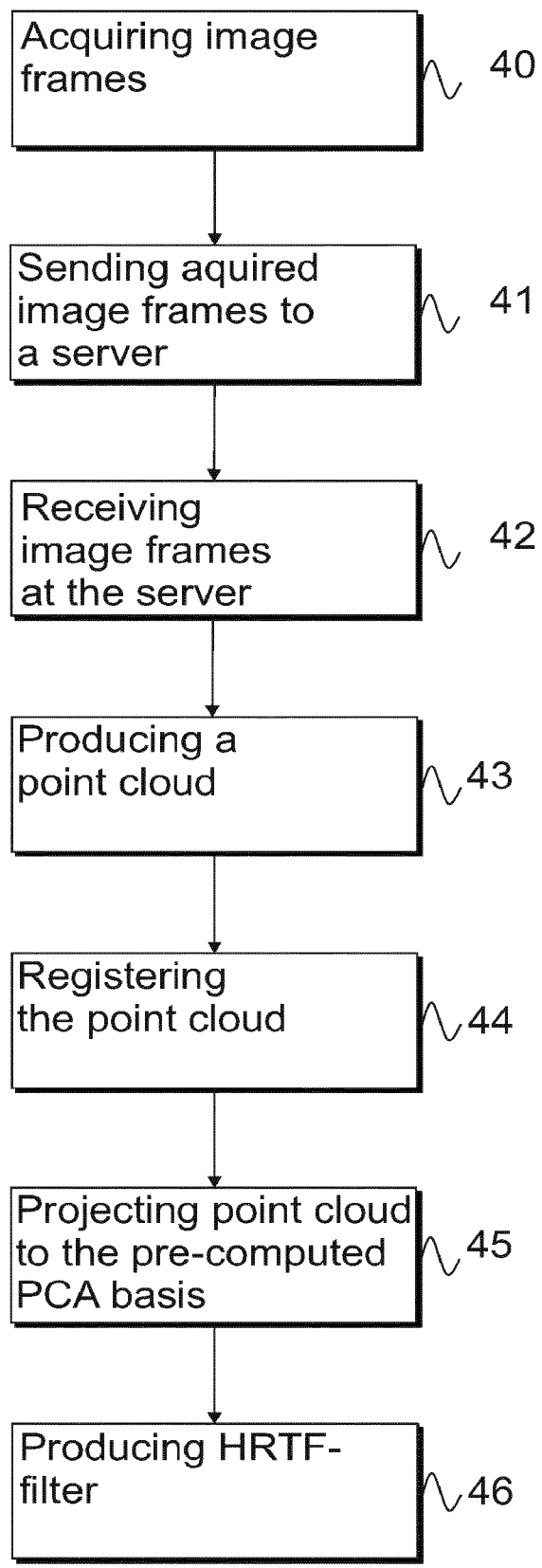
FIG. 4 is a flow chart of an embodiment.

In FIG. 4 a flow chart of a method for arrangement for producing head related transfer function filters using a mobile device as an imaging device is disclosed. The mobile device mentioned above may be any portable camera equipment that is able to execute computer programs and able to transmit acquired images over a network connection to a server. Typically this device is a mobile phone or a tablet computer that normally comprise a camera and are able to execute computer programs. The mobile device comprises a software that is configured to perform a portion of the method disclosed in FIG. 4.

The method is initiated by starting a computer program for acquiring data required for producing a geometry of a human pinna that are used in producing head related transfer function filters. The program is configured to acquire a plurality of image frames or a sequence of video image frames, step 40. The program is configured to instruct the person imaging his or her own head so that at least one ear is imaged from sufficiently different angles. The program may include a feature that is configured to determine the sufficient number of image frames, however, it is possible that the program sends the acquired image frames immediately for further processing and receives an acknowledgement message if acquired image frames are sufficient. In the method of FIG. 4 the determination is done at the mobile device and the acquired images are then sent to the server, step 41.

Figure 1:
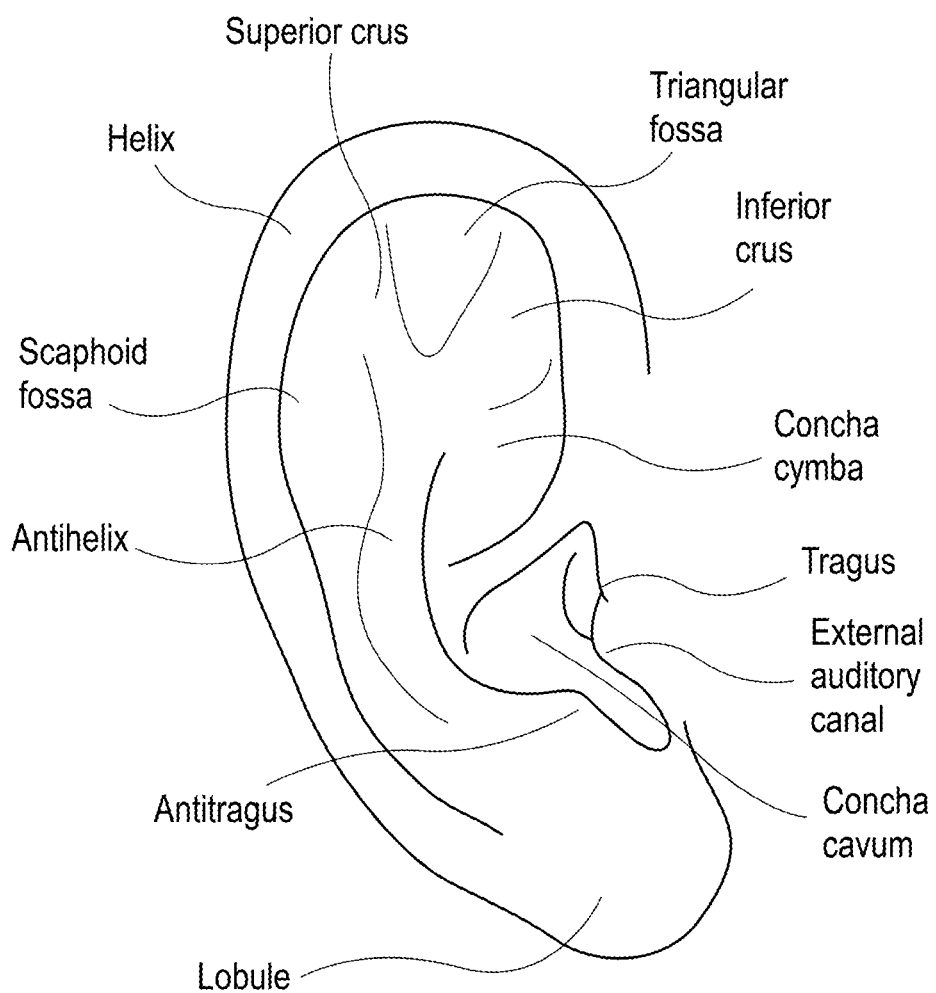
FIG. 1 is an illustration of a pinna and the parts of it.

The server receives a plurality of image frames or a sequence of video, step 42. The received images are processed by determining points that represent certain physical locations in the imaged pinna. For example, one or more points may represent the shape of helix and one or more points may represent tragus. The number of points determined has no upper limit and the number may be increased when more accurate models are desired. Even if a person making the measurements may decide the points measured it is considered that Concha cymba and Concha cavum (see FIG. 1.) are very important ones to measure. Furthermore, as mentioned above, the model needs not to be limited to pinna but the whole head may be analyzed. A point cloud comprising the plurality of points mentioned above may be achieved, for example, by using a structure-from-motion algorithm, step 43.

At the next step the point cloud is registered with the PCA-model, step 44. The registering means here aligning and is achieved by translating, rotating and scaling the point cloud. Thus, the size and orientation of the point cloud is changed so that it will match with the PCA-model and the points that correspond to a certain physical location in the imaged pinna will have corresponding points in the PCA-model. At this stage it is obviously normal that the points do not exactly match with the PCA-model as every pinna has own characteristic After the model has been registered with the PCA model the point cloud is projected to the pre-computed PCA basis, step 45. This can be done, by solving a minimization problem to obtain weight for the pre-computed PCA basis functions. In an alternative embodiment steps 44 and 45 can be combined so that the registration and morphing of the PCA model are done simultaneously. Thus, the method described above derives geometry of the imaged pinna by producing the geometrical values from the PCA model that comprises geometrical values for sample pinnae. The produced set of geometrical values may be unique as the produced set is a combination of different geometries that match best the imaged pinna.

When the geometry or geometrical data values have been produce the HRTF-filter can be produced as it is produced in case of three-dimensional scanned pinna, step 46. The actual production of the HRTF-filter can be done as a service at the same service producing the geometrical data but it is also possible to submit the geometrical data to the customer or another service, which may be provided, for example, by the headphone manufacturer. An example of a method for generating HRTF-filter is described in "Rapid generation of personalized HRTFs Proceedings of AES Conference: 55th International Conference: Spatial Audio, Helsinki, 2014" by T Huttunen, A Vanne, S Harder, R Reinhold Paulsen, S King, L Perry-Smith and L Karkkainen. Also other methods may be used.

The method described above with referral to 35 FIG. 4 is able to produce individual and unique geometrical values and thus unique HRTF-filters for each person instead of using an average HRTF-filter or a HRTF-filter selected from a set of pre-computed HRTF-filters. However, in some cases, where two or more pinnae are almost identical the produced filter is not necessarily unique. Such may happen, for example, in case of identical twins. In a normal case produced filters, however, are unique.

Figure 5:
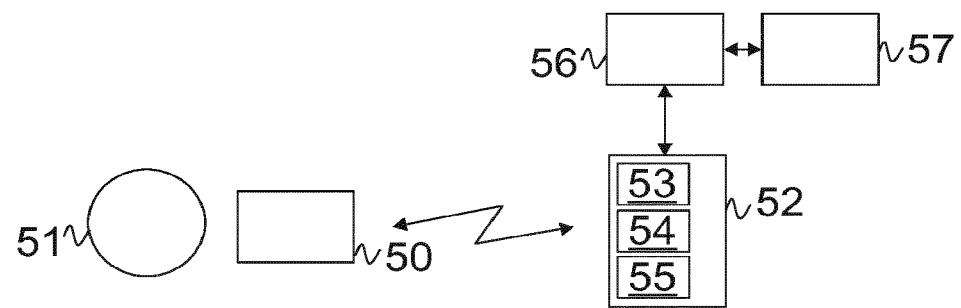
FIG. 5 is a block diagram of an example implementation.

FIG. 5 illustrates an arrangement for producing head related transfer function filters. In FIG. 5 a mobile device 50, such as mobile phone comprising a camera, is used for imaging a head 51 of a person who needs a HRTF-filter. Mobile device 50 comprises imaging software that is configured to instruct the user of the mobile device to take enough images so that the pinna being imaged is sufficiently covered. This can be done, for example, by acquiring a video sequence wherein the software instructs to move the mobile device around the head so that the pinna is seen from all possible directions.

The mobile device uses conventional mobile data communication link for transmitting acquired image frames to a server 52. The server 52 is may be a physical remote computer, virtual server, cloud service or any other service capable of running computer programs. In the present embodiment it is a server comprising at least one processor 53, at least one memory 54 and at least one network interface 55. The at least one processor 53 is configured to execute computer programs and perform tasks instructed by the programs. The at least one memory 54 is configured to store computer programs and store data. The at least one network interface 55 is configured to communicate with external computing devices, such as a database 56.

The server 52 is configured to receive the 35 acquired image frames using at least one network interface 55 and process them as explained above. For example, when the received image frames are in form of a video sequence some image frames may be extracted from the video sequence. Then the desired physical locations of pinna are detected by using at least one processor 53 from each of the image frames and the point cloud is formed by combining information extracted from a plurality of image frames. A person skilled in the art understands that not all desired locations need to be shown in every image frame but depending on the imaging direction some of the desired physical locations may not be visible. The point cloud is then stored into at least one memory 54.

The point cloud is processor by at least one processor 53. The point cloud is first registered so that the dimensions and orientation correspond with the PCA model that is stored into the at least one memory 54 or database 56. The at least one processor is configured to compute the geometry of a pinna being processed by using the received point cloud and the existing model comprising accurate geometrical data so that the existing model is modified, for example, by morphing so that a geometry corresponding with the received point cloud is created. As a result a geometry corresponding the imaged pinna can be created by using inaccurate image data instead of accurate three-dimensional scanners.

The server 52 may be configured to compute a final HRTF-filter and transmit it to the user so that the user may install it to the audio system. If the filter is not produced at this stage the created geometric data is transmitted to the user or to a service for creating HRTF-filters.

In the arrangement of FIG. 5 a three-dimensional scanning unit 57 is shown. It is used for providing samples to the database from which the PCA model is constructed. The model may be refined when new models are received. This, however, does not have any effect on a user who is creating the filter by using a mobile device. Furthermore, the three-dimensional scanning device needs not to be physically connected but the data needed can be transmitted separately without continuous connection.

The above mentioned method may be implemented as computer software which is executed in a computing device able to communicate with a mobile device. When the software is executed in a computing device it is configured to perform the above described inventive method. The software is embodied on a computer readable medium so that it can be provided to the computing a device, such as the server 52 of FIG. 5.

The HRTF-filter discussed above may be placed to different locations. For example, the filter may be used in a computer or an amplifier used for producing sound. The filtered sound is then transmitted to the headphones. It is also possible to implement headphones that include a filter, however, a person skilled in the art understands that this cannot be implemented with conventional two-channel stereo headphones because it is necessary to transmit more sound information to the component including the filter than it is possible by using ordinary stereo wires. Such headphones typically are connected by USB-connector or similar.

In the examples discussed above a two-dimensional conventional camera has been described as they are commonly used. Instead of the two-dimensional camera a three-dimensional camera is used instead of conventional two-dimensional camera. When a three-dimensional camera is used it may be sufficient to have only one three-dimensional image for deriving the point cloud discussed above, however, it is possible to combine two or more three-dimensional images for producing the point cloud. Then, the point cloud is processed similarly as in case of two-dimensional images. Furthermore, it is possible to use both two-dimensional and three-dimensional image frames when determining the point cloud.

In the examples discussed above the point cloud is produced by a server or computer that is other than the imaging unit, such as a mobile phone. It is expected that the computing power of mobile devices will increase in the future. Thus, it is possible that some steps of the method described above will be executed in the mobile device that is configured to acquire image frames needed for further computations. For example, it is possible that the mobile device produces the point cloud and transmits for further processing. It is further possible that the mobile device includes software components that are needed for further processing so that the complete geometrical data is computed in the mobile device and then sent further for producing the HRTF-filter. In another embodiment it is possible that even the filter is produced in the mobile device.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, or any other suitable medium from which a computer can read.

It is obvious to a person skilled in the art that with the advancement of technology, the basic idea of an arrangement for producing head related transfer function filters may be implemented in various ways. The arrangement for producing head related transfer function filters and its embodiments are thus not limited to the examples described above; instead they may vary within the scope of the claims.

What is claimed is:

1. A non-transitory computer readable medium storing instructions that, when executed by one or more processors of a mobile device, cause the mobile device to perform a method, comprising:
    acquiring a plurality of images of a pinna, wherein the plurality of images are acquired at different positions to cover the pinna;
    determining geometrical values of the pinna as output from a statistical model using input based on the plurality of images, the statistical model is trained on a dataset including a plurality of pinna geometries, wherein the statistical model determines the geometrical values by reducing a set of data points representative of the pinna;
    determining, based on the geometrical values, a head-related transfer function (HRTF) filter; and
    producing three-dimensional sound using the HRTF filter.

2. The non-transitory computer readable medium of claim 1, wherein the mobile device is configured to instruct a user to move the mobile device around a head of the user to acquire the plurality of images.

3. The non-transitory computer readable medium of claim 2, wherein the mobile device is configured to instruct a user to move the mobile device such that the plurality of images are acquired at a plurality of different angles to cover the pinna.

4. The non-transitory computer readable medium of claim 1, wherein the plurality of images is a video sequence.

5. The non-transitory computer readable medium of claim 1, wherein the statistical model includes a pre-computed principle component analysis basis.

6. The non-transitory computer readable medium of claim 1, wherein the geometrical values correspond to points of significance in the pinna.

7. The non-transitory computer readable medium of claim 6, wherein the plurality of pinna geometries have the points of significance.

8. The non-transitory computer readable medium of claim 1, wherein determining the geometrical values includes solving a minimization problem for basis functions of the statistical model.

9. A method performed by a programmed processor of a mobile device, the method comprising:
    acquiring a plurality of images of a pinna, wherein the plurality of images are acquired at different positions to cover the pinna;
    determining geometrical values of the pinna as output from a statistical model using input based on the plurality of images, the statistical model is trained on a dataset including a plurality of pinna geometries, wherein the statistical model determines the geometrical values by reducing a set of data points representative of the pinna;
    determining, based on the geometrical values, a head-related transfer function (HRTF) filter; and
    producing three-dimensional sound using the HRTF filter.

10. The method of claim 9, wherein the mobile device is configured to instruct a user to move the mobile device around a head of the user to acquire the plurality of images.

11. The method of claim 9, wherein the mobile device is configured to instruct a user to move the mobile device such that the plurality of images are acquired at a plurality of different angles to cover the pinna.

12. The method of claim 9, wherein the geometrical values correspond to points of significance in the pinna.

13. The method of claim 12, wherein the plurality of pinna geometries have the points of significance.

14. The method of claim 9, wherein determining the geometrical values includes solving a minimization problem for basis functions of the statistical model.

15. A mobile device comprising:
   at least one processor configured to execute computer programs;
   at least one memory configured to store computer programs and related data; and
   at least one data communication interface configured to communicate with external data communication networks;
   wherein the mobile device is configured to:
   acquire a plurality of images of a pinna, wherein the plurality of images are acquired at different positions to cover the pinna,
   determine geometrical values of the pinna as output from a statistical model using input based on the plurality of images, the statistical model is trained on a dataset including a plurality of pinna geometries, wherein the statistical model determines the geometrical values by reducing a set of data points representative of the pinna;
   determine, based on the geometrical values, a head-related transfer function (HRTF) filter; and
   produce three-dimensional sound using the HRTF filter.

16. The mobile device of claim 15, wherein the mobile device is configured to instruct a user to move the mobile device around a head of the user to acquire the plurality of images.

17. The mobile device of claim 16, wherein the mobile device is configured to instruct a user to move the mobile device such that the plurality of images are acquired at a plurality of different angles to cover the pinna.

18. The mobile device of claim 15, wherein the geometrical values correspond to points of significance in the pinna.

19. The mobile device of claim 18, wherein the plurality of pinna geometries have the points of significance.

20. The mobile device of claim 15, wherein determining the geometrical values includes solving a minimization problem for basis functions of the statistical model.

* * * * *